G. Emerson,
Grinding Card Teeth.
N° 5,948.    Patented Dec. 5, 1848.
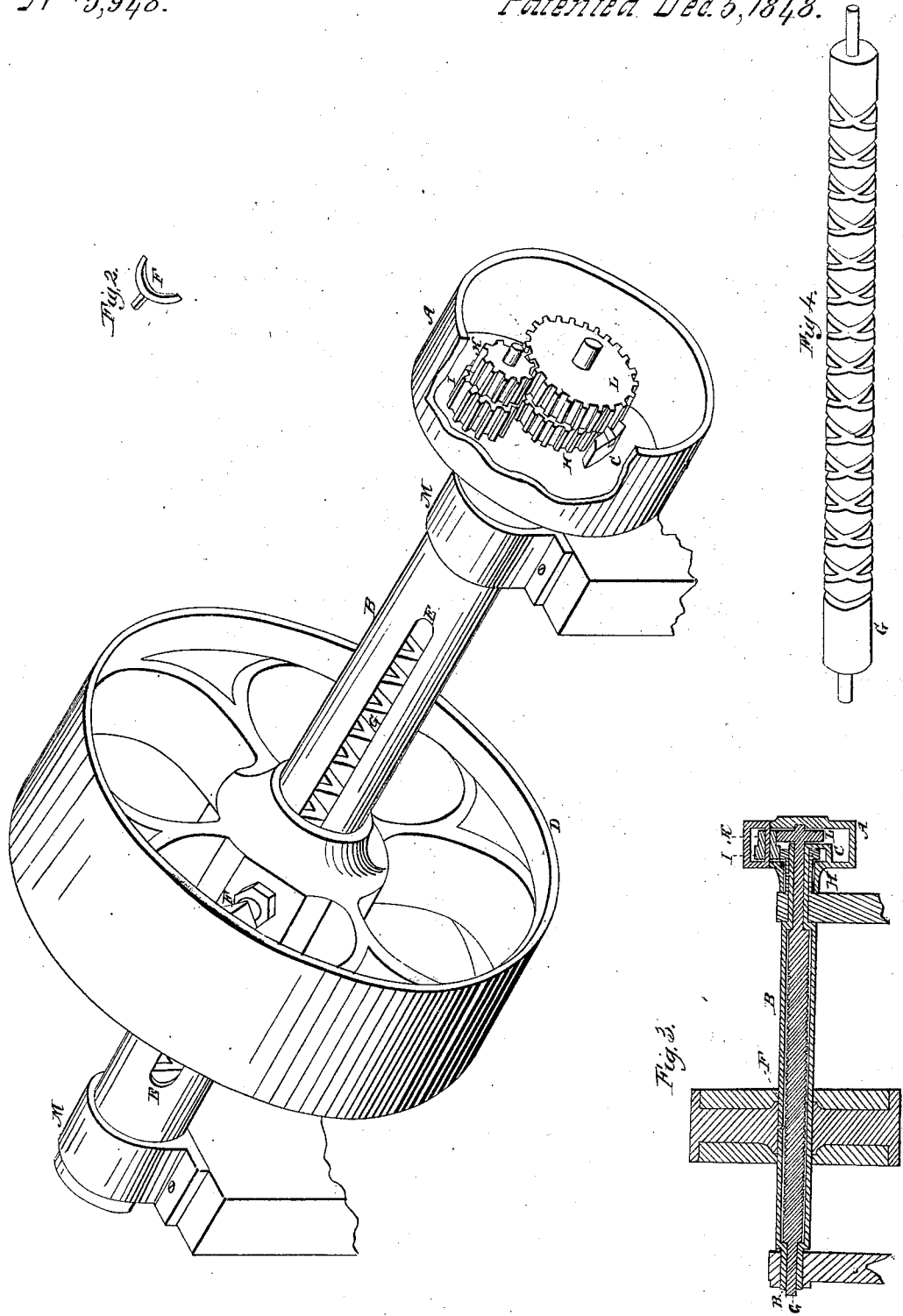

UNITED STATES PATENT OFFICE.

GEORGE EMERSON, OF DYERVILLE, RHODE ISLAND.

MACHINE FOR GRINDING CARD-TEETH.

Specification forming part of Letters Patent No. 5,948, dated December 5, 1848.

*To all whom it may concern:*

Be it known that I, GEORGE EMERSON, of Dyerville, town of North Providence, in the county of Providence and State of Rhode Island, have invented a new and useful Machine for Grinding the Teeth on Cotton and Woolen Cards, called a "Card-Grinder;" and I do hereby declare that the following is a full, clear, and exact description of the construction and operation of the same, reference being had to the annexed drawings, making a part of this specification, in which—

Figure 1 is a perspective view of the machine with the end and part of the side of the driving-pulley removed to show the gears contained within it. Fig. 3 is a longitudinal section, and Figs. 2 and 4 are detached portions which are described in their proper connection.

The moving pulley A is fastened, by means of the projection and connecting-piece C, to the hollow shaft B, which revolves within the bearings M M. The grinding-pulley D slides upon this shaft, but revolves with it, the screw F passing through the slit E E. The shaft G moves within the hollow shaft B. It is grooved with an endless screw traversing the shaft in one direction and then returning in the other, as represented in Fig. 4. By means of the gear within the driving-pulley the inner or screw shaft G moves slower than the external shaft. This may be seen by inspecting the section, Fig. 3. The wheel H is stationary, being attached to the bearings I and K, are formed of one solid piece of iron, are carried with the pulley around H, and L L carries the screw-shaft, and it is evident from the comparative size of these wheels that L will move slower than the pulley.

The crescent-shaped piece of iron represented in Fig. 2 is made to fit into a cavity in the end of the screw F and to slide in the groove of the shaft G, and by the velocities of G and B it is carried, together with the grinding-wheel, alternately backward and forward throughout the extent of the groove. By adjusting the relative size of the gear-wheels the grinder may be made to revolve any required number of times during each vibration along the shaft.

What I claim as my invention, and desire to secure by Letters Patent, is—

The combination of the sun-and-planet gearing, consisting of four cog-wheels, as described, with the hollow shaft, double-threaded screw, and crescent-shaped piece of iron, (Fig. 2,) by means of which a rotary and traversing motion of the grinding-wheel is obtained, the whole being arranged and operated substantially as hereinbefore set forth.

In testimony whereof I have hereto set my signature this 9th day of November, A. D. 1848.

GEORGE EMERSON.

Witnesses:
 ELISHA DYER, Jr.,
 ROBERT WILSON.